United States Patent Office 2,711,399
Patented June 21, 1955

2,711,399

SILICONE RUBBER WITH PREAGED CARBON BLACK

Robert Smith-Johannsen, Niskayuna, N. Y., assignor to General Electric Company, a corporation of New York No Drawing. Application February 6, 1952,
Serial No. 270,273

10 Claims. (Cl. 260—37)

This invention is concerned with silicone rubbers of improved heat-aging characteristics. More particularly, the invention relates to a composition of matter comprising (1) a basic, alkaline-condensed, benzene-soluble polydiorganosiloxane (for brevity hereinafter referred to as "diorganosiloxane") convertible to the solid, elastic state in which essentially all the structural units are R₂SiO where R represents radicals some of which may be unlike, selected from the class consisting of silicon-bonded monovalent lower alkyl radicals and aryl radicals and in which diorganosiloxane, at least 75% of the total number of R groups are lower alkyl radicals, and (2) from 0.1 to 12.0%, by weight, based on the weight of the diorganosiloxane, of finely divided carbon. The invention also includes methods for making such heat-convertible compositions described above as well as the heat-converted products derived therefrom.

Silicone rubber has found wide use in applications requiring flexible materials capable of withstanding elevated temperatures for long periods of time. Thus, it is known that silicone rubber can be used at temperatures of around 200° to 250° C. for relatively long periods of time without serious deterioration of the silicone rubber. In this respect, silicone rubber is eminently superior to natural or other synthetic rubbers which are limited to uses at temperatures well below 200° C. However, it has been found that although silicone rubber ages well at temperatures of about 200 to 250° C., attempts to use this material at temperatures above 250° C., for example at 300° or 325° C. for any length of time tend to cause decomposition of the rubber, and after relatively short periods of time, decomposition has taken place to such an extent that the silicone rubber is of little use. In addition, it has been found that silicone rubber at elevated temperatures begins to lose its strength and elasticity.

It is a primary object of this invention to extend the temperature range at which silicone rubber can be used.

Another object of my invention is to improve the high temperature aging properties of silicone rubber.

Still another object of my invention is to preserve the strength and elongation properties at elevated temperatures of silicone rubbers.

Another object of the invention is to improve the insulation resistance of silicone rubber.

A still further object of this invention is to reduce the tendency of silicone rubber to creep at elevated temperatures.

Another object of this invention is to permit the incorporation of flame retardants in silicone rubber so that the heat aging properties of the latter are not adversely affected at elevated temperatures due to the presence of the aforsaid flame retardants.

All the aforesaid objects can be realized by incorporating in the silicone rubber, prior to vulcanization or conversion thereof to the substantially insoluble and infusible state, a small amount of carbon. In order to derive the benefits mentioned above, it is essential that precautions be taken as to the type of heat-convertible diorganosiloxane employed. The diorganosiloxane or diorganopolysiloxane is one in which the siloxane units consist essentially of the structural formula R₂SiO where R is a lower alkyl radical, for example, methyl, ethyl, propyl, isopropyl, butyl, etc., radicals; aryl radicals, for example, phenyl, tolyl, naphthyl, etc., radicals. It is preferred that at least 75% and preferably 90% of the total number of R groups be lower alkyl radicals, for example, methyl radicals. The polysiloxane may be one in which all the siloxane units are (CH₃)₂SiO or the siloxane may be a copolymer of dimethyl siloxane and a minor amount of any combination of the following units:

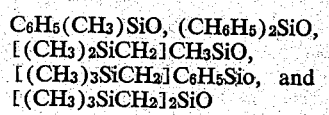

All polysiloxanes of the above type do not produce the improved elastomers of this invention. In order for the advantages of the present invention to be obtained the polymer employed must be one in which the total number of organic groups per silicon atom is around 2.0 or at least about 1.999 and below about 2.001 organic groups, that is R groups, per silicon atom. It has been found that when one employs a dimethylsiloxane containing intercondensed monoorganosiloxane units, e. g., monomethylsiloxane units of the formula

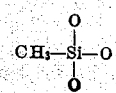

so that the ratio of methyl groups to silicon atoms is below 1.999, e. g., about 1.98, the incorporation in the heat-convertible diorganosiloxane composition of the small amounts of carbon called for in the present invention does not result in any appreciable advantage in the heat-aging properties of the converted or vulcanized organopolysiloxane.

In addition to the foregoing requirements for the constitution of the polysiloxane, it is also essential that the polysiloxane be obtained by means of condensation of the lower molecular weight diorganosiloxanes used for that purpose with an alkaline condensing agent. Among such alkaline condensing agents may be mentioned, for instance, alkali-metal hydroxides, for example, sodium hydroxide, potassium hydroxide, lithium hydroxide; potassium naphthalene, potassium amide, alkali-metal salts of triorganosilanols; potassium acetonyl acetone; potassium metal, quaternary ammonium hydroxides or alkoxides, for example, benzyl trimethyl ammonium hydroxide, benzyl trimethyl ammonium butoxide, etc. The use of acidic condensing agents such as, for example, hydrochloric acid, phosphoric acid, sulphuric acid, etc., is to be avoided since the aging properties at high temperature of the final product containing carbon incorporated therein are materially inferior to the properties of silicone elastomers prepared originally by means of an alkaline condensation catalyst. In order to maintain the alkalinity of the convertible polydiorganosiloxane, it is usually advantageous to permit the alkaline catalyst to remain in the polymer after the lower molecular weight product is converted to the so-called gum stage prior to incorporation of the filler and other ingredients, such as catalyst, additives, etc.

As a still further requirement for the type of organopolysiloxanes employed in the practice of the present invention, it is also essential that they be soluble in benzene as compared to the insoluble silicone gels or gums ordinarily produced by the use of diorganopolysiloxanes containing intercondensed monoorganosiloxane units. In making these benzene-soluble polysiloxanes, it is generally desirable to use a low molecular weight diorganosiloxane, for example, octamethylcyclotetrasiloxane having the formula

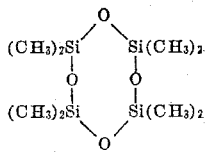

and a small amount of an alkaline condensing agent, for example, about 0.01%, by weight, based on the weight of the aforementioned organopolysiloxane, and heat the material, for instance, at about 125 to 150° C., until the desired increase in viscosity is obtained. As will be apparent to those skilled in the art, other alkaline condensing agents may be employed and the concentration of the alkaline condensing agent may be varied substantially. In this connection, it may be desirable to use, for example, from about 0.001 to 0.2 percent, preferably from about 0.0015 to 0.05 percent, by weight, of the alkaline condensing agent, based on the weight of the organopolysiloxane employed. The condensing agent alternatively may be employed in an amount ranging from about 1 alkali metal atom per 10,000 silicon atoms to 1 alkali metal atom per 50 silicon atoms until a substantially hydroxyl-free polysiloxane is obtained. If desired, the alkaline condensing agent may be dissolved in a small amount of solvent therefor prior to incorporation in the polysiloxane in order to obtain a better dispersion of the condensing agent.

The condensation of the polysiloxane is carried out until a product of high viscosity or very little flow at room temperature is obtained. These materials are generally soft at room temperature, are at least slightly tacky and possess little or no elastic recovery when stretched or compressed. In appearance these materials are somewhat similar to the insoluble SiOSi cross-linked gels or gums from which silicone rubbers have been made in the past. It has been found that melt viscosities of from about 5,000 to 1,000,000 centipoises or higher are generally satisfactory, although lower or higher viscosities may be useful. One method for determining the optimum degree of condensation is to ascertain the penetrometer reading which generally should be less than 380 (expressed in units of millimeters) after 10 seconds at 25° C. as determined in accordance with ASTM, D-217-44T. Generally, the most usable form of these materials is the highly viscous product whose viscosity is so high that as a practical matter it is almost impossible to determine the fluid viscosity in centipoises.

If desired, instead of employing a polysiloxane for the condensation step in which all the organic groups are the same, for example, the aforementioned octamethylcyclotetrasiloxane, one may employ mixtures of polysiloxanes, for example, a mixture of about 90 mol percent of the aforesaid octamethylcyclotetrasiloxane and hexaphenylcyclotrisiloxane, octaphenylcyclotetrasiloxane, tetramethyltetraphenylcyclotetrasiloxane of the formula [(CH3)(C6H5)SiO]4 etc. If desired, especially when intercondensed phenyl-siloxy units are contemplated, the phenyl group may have halogen substituted thereon. Among such intercondensed groupings may be, e. g., (Cl$_n$C6H$_{4-n}$)SiO, (Cl$_n$C6H$_{4-n}$) (CH3)SiO, etc., where $n$ is an integer equal to from 1 to 4, inclusive, (F2C6H3)2SiO, etc. Intercondensation of the polysiloxanes takes place in the presence of the heat and the condensing agent so that the final product contains dimethylsiloxy units as well as, for instance, intercondensed diphenylsiloxy units. Of course, it will be apparent that instead of using the pure cyclic derivatives, it may also be possible to use silicols as, for example, mixtures of the octamethylcyclotetrasiloxane and methyl phenylsilicol or diphenylsilicol. It is preferred that in the preparation of the diorganopolysiloxane the organic groups be either all methyl groups or methyl and phenyl groups in which at least 90% of the total organic groups are methyl groups, and that the ratio of total organic groups to silicon atoms be as close to 2.0 as possible.

The type of carbon which is employed in the practice of the invention may be any one of those finely divided carbon products commercially available and may include, for instance, gas black, various thermal carbons, furnace blacks, bone black, channel black, acetylene black, graphite, etc., as well as various modifications of such carbons. The examples below show the effect of using various kinds of carbon blacks manufactured by different firms and produced in a variety of manners. The amount of carbon (for brevity the word "carbon" will be used to include not only carbon itself but also carbon blacks and graphite) may be varied but there are critical limits beyond and below which either no appreciable effect is derived or else the advantage of using the carbon begins to diminish rapidly. I have found that based on the weight of the heat-convertible diorganosiloxane, I may use with noticeable effect from 0.1% to 12%, by weight, of the carbon. Below 0.1%, little effect was noticed as far as the improvement of the properties of the diorganosiloxane was concerned when the latter was vulcanized with a filler in the presence of heat to give a heat-converted substantially insoluble and infusible product. When the amount of carbon exceeds about 12%, by weight, of the diorganosiloxane (the word "diorganosiloxane" will be employed in the present description of the invention and in the appended claims to include the condensed, benzene-soluble material which can be converted by the use of a vulcanization accelerator, such as benzoyl peroxide, to the substantially infusible and insoluble state), the improvement in the properties of the cured product, particularly in the heat-aging characteristics, becomes less pronounced. In addition, the larger amounts of carbon appear to inhibit cure of the rubber. Although this inhibition can be overcome to some extent by the use of larger amounts of cure accelerator, nevertheless such larger amounts of the latter have a deleterious effect on the properties of the final molded product. The optimum properties appear to occur when the amount of carbon is around 2 to 10 percent, by weight, carbon, based on the weight of the diorganosiloxane. The particle size of the carbon is not too critical, but for better dispersability and use, it is preferred that the size be that used in connection with carbon employed as reinforcing agents for other well-known natural and synthetic rubbers. Thus, the area of the carbon powder, e. g., carbon black, may be about 20 to 300 square meters per gram.

One of the unexpected features of my invention includes the discovery that the manner in which the carbon is incorporated in the diorganosiloxane may be critical as far as the physical properties of the heat-converted product are concerned when the latter is subjected to elevated temperatures, for example, above about 600° F. or 315° C. for relatively long periods of time, that is for times much longer than heat-converted silicone elastomers heretofore have been able to withstand. Thus, it has been found that the order in which the diorganosiloxane, the filler, and the carbon are incorporated has a marked effect on the ultimate properties of the finely converted material. It was found that when the order of the aforementioned three ingredients was varied by using different permutations, the tensile strength and elongation of the product obtained after heat conversion and aging for 24 hours at 250° C. varied extensively. However, this, of course, does not mean that the incorporation of the carbon for applications requiring use of the cured material at 250° C. may not be acceptable, since in many instances the physical properties were satisfactory for a great number of applications. However, one of the unexpected results was that when these somewhat weaker molded samples were heat-aged for 24 hours at 315° C., in almost every instance the tensile strength and elongation (with one exception in which the elongation remained the same) were materially better than when the heat-aging was conducted for 24 hours at 250° C. This discovery shows graphically the advantage to be derived from incorporating carbon in the diorganosiloxane where the latter in the cured elastomeric state was to be used at temperatures well above those heretofore believed possible for even silicone rubbers.

I have unexpectedly found that under certain conditions, even with the presence of the carbon in the diorganosiloxane, I am able to get properties at 250° C. which are often comparable and in some respects better than the properties of silicone elastomers obtained without the carbon present therein. This particular discovery involves the use of the carbon in a form in which it has been permitted to age alone in intimate contact with some of the diorganosiloxane. Thus, I have found that if one mixes the carbon which is to be employed as an additive for the silicone rubber with the unconverted diorganosiloxane and ages the mixture for certain lengths of time (which aging can be accelerated by various procedures), that this aged carbon-diorganosiloxane mixture, when later incorporated in the diorganosiloxane itself, taking into consideration the amount of diorganosiloxane used in making the aged carbon concentrate so that an equivalent amount of diorganosiloxane will be deducted from the moldable or heat-convertible formulation, and thereafter the material compounded with the cure accelerator and specific filler employed, that the properties of the heat-converted product when aged at 250° C. for 24 hours are comparable to the properties of an identical material heat-aged similarly but from which the carbon has been omitted. However, in contrast to the latter material whose properties are rapidly destroyed at 315° C. for 24 hours, the composition containing the aged carbon has the same and in some instances even better properties than that obtained when heat-aged at 250° C. for 24 hours.

I have found that this aging of the carbon in the presence of the diorganosiloxane may advantageously take place at room temperature for around 12 to 16 hours. This aging may also be accelerated by hot-milling the mixture of the carbon and the diorganosiloxane on compounding rolls, for instance, at temperatures of about 100° to 125° C. for about 10 to 15 minutes or more. Of course, this latter procedure for obtaining the carbon aged in contact with the diorganosiloxane requires additional processing, manual attention, and equipment, whereas the aging of the carbon at room temperature is believed to be more attractive for economical reasons. The manner of aging is not critical as long as the carbon and the convertible diorganosiloxane are in intimate contact with each other for a sufficient length of time to permit adequate interaction between these two ingredients to take place by some presently unknown mechanism.

The proportion of carbon which can be employed with the diorganosiloxane for this aging requirement can be varied widely. For convenience, I have found that I may use, on a weight basis, from about 1 to 2 parts of carbon to from about 1 to 10 parts of the diorganosiloxane. The use of proportions of carbon greater than this range may result in compounding difficulties. Generally I have found that the use of one part of carbon to two parts of diorganosiloxane when intimately mixed for a short period of time on compounding rolls and thereafter permitted to age at around 16 hours at room temperature gives a satisfactory material which can then be incorporated in the regular heat-convertible silicone elastomer formulation.

It was believed heretofore that benzoyl peroxide would not cure carbon-filled silicone rubber as is more particularly described in U. S. Patent 2,521,528, Marsden. Unexpectedly I have found that diorganosiloxanes containing small amounts of carbon in combination with other fillers can be satisfactorily cured or vulcanized at elevated temperatures with benzoyl peroxide as the cure accelerator to obtain products whose properties are at least comparable and in most instances better than when tertiary butyl perbenzoate is used as the cure accelerator as is more particularly disclosed in the aforementioned Marsden patent. However, the latter catalyst, although it gives good initial properties, is of no use when samples using it are heat-aged at 315° C. Benzoyl peroxide is the preferred catalyst in combination with the use of the carbon.

Generally, the amount of catalyst which may be employed in the practice of the present invention may vary from about 1 to 6 or more percent, by weight, thereof based on the weight of the diorganosiloxane. I have found that as the amount of carbon is increased in the formulation with the diorganosiloxane and the filler, that it is advantageous, especially in order to obtain optimum properties in molded products, also to increase the amount of cure accelerator, for instance, the benzoyl peroxide. If this is done, the properties of the finally cured product will remain at an optimum level at either 250° C. or 315° C. heat-aging. The limiting amount of cure accelerator used is dictated by the desired characteristics in the finally cured product, and because of this the amount of carbon which may be employed in the practice of this invention is materially limited. Generally I have found that the use of from about 1.5 to about 6 percent benzoyl peroxide in combination with amounts of carbon up to 12 percent are adequate in most cases for obtaining maximum properties in the finally cured material.

Various inorganic metallic oxide fillers may be added to the diorganosiloxane in making the heat-convertible and ultimately the heat-converted or vulcanized materials. These fillers may be of the reinforcing or non-reinforcing type. Among such fillers which may be employed in this invention may be mentioned, for example, fillers such as lithopone, calcium carbonate, ferric oxide, titanium dioxide, talc, zinc oxide, etc. A filler which has been found to be especially useful and which is one of the few reinforcing fillers known for silicone rubber is finely divided silica with reinforcing properties. Among such finely divided silicas are silica aerogels, silicas produced by various fuming processes which have desired properties, certain diatomaceous earths modified to increase some of their physical characteristics, etc. Such types of reinforcing silica fillers are more particularly disclosed in Warrick Patent 2,541,137. It should be noted that regardless of whether the filler is reinforcing or not, the incorporation of the carbon improves the high temperature, e. g., above 300° C., heat-aging properties of the silicone elastomer.

In general, the amount of filler employed may also be varied within wide limits. Thus, based on the weight of the diorganosiloxane, the filler may comprise by weight from about 5 to 200%, preferably from about 25 to 75 percent of the weight of the diorganosiloxane. I have found that for each part of diorganosiloxane employed in preparing the heat-convertible formulation, I advantageously may use from about 0.25 to about 1 part of filler. Obviously the amount of filler used will be dictated by several factors including, for instance, the wettability of the filler by the diorganosiloxane, the application for which the heat-converted product is desired (including the hardness desired), the type of diorganosiloxane employed, the type of filler used, etc.

In order to prepare the synthetic elastomers from the heat-convertible product, the latter may be worked on ordinary mixing or differential rubber rolls for a period of time until the desired consistency is attained, and thereafter the filler, cure accelerator and carbon added in any manner or order desired, taking into consideration the effect of varying the order of adding the ingredients, and the effect of adding the carbon in the form of an aged mixture with the diorganosiloxane. Thereafter, the heat-convertible mixture may be molded at various pressures ranging, for example, from about 250 to 1000 p. s. i. at temperatures of the order of from about 110° to 150° C. or higher. The time at which this molding cycle may take place may also be varied and advantageously in many instances has been found to range from about 10 to 20 minutes. Thereafter, the synthetic elastomer thus obtained may be further cured or heat-treated, for example, in an oven at temperatures of the order of about 200° to 250° C. until the desired degree of cure is obtained and preferably until a substantially infusible and insoluble product is obtained.

In order that those skilled in the art may better understand how the present invention may be practiced, the following examples are given by way of illustration rather than by way of limitation. All parts are by weight. The diorganosiloxane employed in the following examples, unless stated otherwise, consisted of a highly viscous substantially non-flowable dimethylsiloxane obtained by condensing at a temperature of about 150° C. for about 6 hours, octamethylcyclotetrasiloxane with about 0.01 percent, by weight, thereof potassium hydroxide. This polymer was completely soluble in benzene and had a penetrometer reading of below 380 in 10 seconds at about 25° C. The melt viscosity was about 2,000,000 centipoises and had slight flow at room temperature. For brevity in the following examples, this polymeric dimethylsiloxane will be referred to as "polydimethylsiloxane."

EXAMPLE 1

In this example, the polydimethylsiloxane polymer described above, silica aerogel (specifically Santocel CS manufactured by Monsanto Chemical Company), benzoyl peroxide, and furnace carbon black (manufactured by Shawinigan Chemical Company) were mixed together and compounded on rubber differential rolls in various ways. For reference to show the order of compounding, the ingredients were identified as follows:

GENERAL FORMULATION I

| | Parts |
|---|---|
| a. Polydimethylsiloxane | 100 |
| b. Silica aerogel | 45 |
| c. Furnace carbon black finely divided) | 2.0 |
| d. Benzoyl peroxide | 1.65 |

After mixing the ingredients together, the mixture was then molded in a closed mold in the form of flat sheets (from which test specimens could be cut out) at about 130° C. for about 15 minutes at a pressure of approximately 500 p. s. i. Thereafter, the molded samples were heat treated for 24 hours at 250° C. and further heat-treated at 315° C. and tested after each heat-aging for Shore A hardness, tensile strength, and percent elongation.

A control was also carried out wherein the furnace carbon black was omitted from the formulation. In addition several compositions were prepared, molded and tested in which the ingredients were added in a certain order but the furnace carbon black was added in the form of an aged concentrate (so designated hereinafter) by mixing together intimately about 1 part, by weight, of the furnace carbon black and 2 parts, by weight, of the polydimethylsiloxane and permitting this mixture to remain and age at room temperature for about 16 hours after which it was added to the formulation above taking into account that sufficient amount of the polymethylsiloxane be subtracted to compensate for the polydimethylsiloxane present in the aged concentrate. This addition of the aged concentrate was also made in two different ways varying the order of adding the ingredients. It should be noted that the point at which the peroxide is added is immaterial. Finally, samples were also prepared in which instead of using the polydimethylsiloxane described above, a polydimethylsiloxane containing about 5 mol percent intercondensed diphenylsiloxane was also used in the same formulation as described above (I), and this too was varied as far as order of adding the various ingredients and as far as the use of aged concentrate of the furnace carbon black and the polydimethyldiphenylsiloxane was concerned. A control without the furnace carbon black was also prepared similarly as was done in connection with the control for the straight polydimethylsiloxane. The following table shows the order during compounding of adding the ingredients together with the type of diorganosiloxane employed.

Table I

| Compound Number | Order Ingredients Added |
|---|---|
| 1 | a, b, c, d. |
| 2 | a, c, b, d. |
| 3 | a, b, c*, d. |
| 4ᵃ | a, b, d, c*. |
| 5 | control (no carbon black). |
| 6** | a, b, c, d. |
| 7** | a, c, b, d. |
| 8** | a, b, c*, d. |
| 9** | a, c*, b, d. |
| 10** | control (no carbon black). |
| 11ᵃ,ᵇ | a, b, d, c*. |

*Aged concentrate of carbon black and diorganosiloxane.
**Polydimethyldiphenylsiloxane.
ᵃ The mixture of polydimethylsiloxane, filler, and peroxide was permitted to age at room temperature together for about 16 hours before addition of the carbon black concentrate.
ᵇ Aged concentrate prepared by hot milling polydimethylsiloxane and carbon black for 10 minutes at 125° C.

The results of tests described above conducted on the various molded samples is found disclosed below in Table II.

Table II

HEAT-AGING

| Compound No. | 24 Hrs. at 250° C. | | | 24 Hrs. at 315° C. | | |
|---|---|---|---|---|---|---|
| | Shore A Hardness | Tensile Strength, p. s. i. | Percent Elongation | Shore A Hardness | Tensile Strength, p. s. i. | Percent Elongation |
| 1 | 55 | 195 | 160 | 59 | 481 | 220 |
| 2 | 61 | 250 | 270 | 55 | 456 | 270 |
| 3 | 64 | 377 | 360 | 62 | 599 | 210 |
| 4 | 35 | 684 | 320 | (¹) | (¹) | (¹) |
| 5 | 50 | 700 | 250 | 80 | 270 | 39 |
| 6 | 40 | 212 | 170 | 48 | 386 | 160 |
| 7 | 50 | 323 | 190 | 55 | 473 | 180 |
| 8 | 52 | 365 | 240 | 57 | 515 | 160 |
| 9 | 58 | 508 | 310 | 60 | 558 | 150 |
| 10 | 74 | 739 | 200 | 88 | 411 | 30 |
| 11 | 50 | 740 | 300 | 66 | 628 | 100 |

¹ No measurements.

The higher values for the controls at 250° C. heat-aging were due to the fact that the polydimethylsiloxane and silica aerogel were aged in intimate contact with each other prior to use in each formulation (see Example 4).

From the results shown in Table II, it is clearly apparent that the incorporation of the carbon either directly or by means of the aged concentrate markedly preserved the heat-resistance of the silicone elastomer at the 315° C. temperature as compared to the controls which deteriorated badly at this elevated temperature. It should be pointed out that the incorporation of the finely divided furnace carbon black may give a product at 315° C. which has improved properties over those of the product heat-treated at 250° C. Because of this, it appears that carbon may also be used to improve the properties of silicone rubber compositions which do not meet specifications to a point whereby they may either approach control specifications for the cured elastomer, or even exceed the requirements of the specifications at elevated temperatures above 315° C.

Unless otherwise specified in the following examples, the aged concentrate of carbon black was added to an aged mixture of the polydimethylsiloxane (or methyl phenyl polysiloxane), filler and cure accelerator. This latter aged mixture was prepared by intimately mixing the ingredients on rubber compounding rolls and permitting them to remain and age at room temperature (25° C.) for about 16 hrs. prior to addition of the carbon black concentrate and any additional cure accelerator which might be required.

EXAMPLE 2

This example illustrates the effect of varying the amount of carbon black which in this case was added in the form of an aged concentrate obtained by intimately mixing on compounding rolls one part of carbon black (in this case Shawinigan carbon black CF) with two parts of the polydimethylsiloxane described above and permitting it to remain for 16 hours at room temperature. A formulation was prepared in which 100 parts of the polydimethylsiloxane, 45 parts of silica aerogel, 1.65 parts of benzoyl peroxide, and varying amounts of the above-described aged concentrate of carbon black in polydimethylsiloxane was added. The polydimethylsiloxane and silica aerogel were aged for 16 hours at room temperature in intimate contact with each other prior to use in the above formulation. After milling in the ingredients, the formulations were aged at room temperature for 24 hours before molding in the press. Thereafter the compositions were subjected to the same molding cycle described in Example 1 for the silicone elastomers therein defined and tested after heat-aging for 24 hours at 250° C. and then for 24 hours at 315° C. The following Table III shows the concentration of carbon black (in the form of aged concentrate) in the various samples together with the test results obtained after heat aging the samples at the different temperatures.

*Table III*

HEAT-AGING

| Carbon Black Concentration, Parts per 100 Parts Polydimethylsiloxane | 24 Hrs. at 250° C. | | | 24 Hrs. at 315° C. | | |
| --- | --- | --- | --- | --- | --- | --- |
| | Shore A Hardness | Tensile strength, p. s. i. | Percent Elongation | Shore A Hardness | Tensile strength, p. s. i. | Percent Elongation |
| 0.000 (control) | 40 | 770 | 250 | (²) | (²) | (²) |
| 0.001 | 44 | 623 | 200 | (²) | (²) | (²) |
| 0.010 | 40 | 621 | 200 | (²) | (²) | (²) |
| 0.100 | 43 | 617 | 190 | 95 | (³) | (³) |
| 0.500 | (¹) | (¹) | (¹) | 61 | 475 | 112 |
| 2.000 | 50 | 740 | 300 | 66 | 628 | 100 |

¹ Not tested.
² Crumbled and decomposed.
³ Somewhat brittle but well preserved.

The above Table III shows that at 250° C. the carbon black has reduced somewhat both the tensile strength and percent elongation and in approximately the same amount until the concentration of the carbon black had been raised to above 0.1 part. Additional carbon black caused an increase in elongation. When aged at 315° C., the samples containing 0.001 and 0.010 part of aged carbon black were completely destroyed and crumbled, while the sample containing 0.100 part carbon black had not deteriorated except to gain in Shore hardness and lose in elongation. Further increase in carbon black concentration promoted improvements in both tensile strength and percent elongation at 315° C.

EXAMPLE 3

This example illustrates the effect of using a heat-convertible organopolysiloxane containing even small amounts of copolymerized monoorganosiloxane, for example, in this case polydimethylsiloxane containing about 0.40 mol percent copolymerized monomethylsiloxane. More particularly, a polymeric dimethylsiloxane oil obtained by hydrolyzing dimethyldichlorosilane containing 0.40 mol percent methyltrichlorosilane was condensed with about 0.1 percent, by weight, thereof, partially hydrated ferric chloride until a solid elastic product substantially insoluble in benzene was obtained. A molding composition was prepared from 100 parts of the above-identified benzene-insoluble gum, 150 parts diatomaceous earth, 1.5 parts benzoyl peroxide, and varying amounts of the aged concentrate of carbon black (1 part carbon black to 2 parts gum aged for 16 hours at room temperature as described in Example 2) taking into account that the amount of gum in the concentrate should be subtracted from the 100 parts of gum used in the formulation so that at all times the total amount of gum present therein is equal still to about 100 parts. Each of the molded compositions which were obtained using the same molding cycle described in Example 1 was then subjected to further heat-aging for 24 hours at 250° C. in an air circulating oven and thereafter for 24 hours at 315° C. Table IV below shows the effect of adding the aged carbon black concentrate to the silicone elastomer which contained the intercondensed trifunctional monomethylsiloxy units.

*Table IV*

| Carbon Black Concentration, Parts Per 100 Parts Polydimethylsiloxane | Heat Aged, 24 Hrs. at 250° C. | | |
| --- | --- | --- | --- |
| | Shore A Hardness | Tensile Strength, p. s. i. | Percent Elongation |
| Control—no carbon black | 79 | 614 | 60 |
| 1 | 80 | 644 | 70 |
| 10 | 65 | 414 | 80 |
| 20 | 75 | 339 | 60 |
| 25 | 70 | 281 | 60 |

When all the foregoing samples in Table IV were heat-aged for 24 hours at 315° C., they became very brittle and crumbled and had no measurable strength.

EXAMPLE 4

It should be recognized that the type of carbon, that is its method of manufacture may influence the heat-aging properties of the silicone elastomer. However, as far as is known, the incorporation of carbon in whatever form and regardless of the manner in which it was made will improve the high temperature heat-aging characteristics of the silicone elastomer. In this example, the effect of using various types of carbons, including carbon blacks and graphite, is shown. Again aged concentrates of the respective carbons were made by intimately mixing one part of the carbon with two parts of the polydimethylsiloxane described and employed previously. This mixture was aged this time for 24 hours at room temperature prior to incorporation in the polydimethylsiloxane. The formulation used comprised the following:

200 parts polydimethylsiloxane ⎫
90 parts silica aerogel (Santocel CS) ⎬ 150 parts of this mixture.
3.30 parts benzoyl peroxide ⎭
Aged concentrate of carbon black___ 5 parts.
Benzoyl peroxide_____ 1.5 parts.

The polydimethylsiloxane and silica aerogel were aged alone in intimate contact with each other for 16 hours at room temperature before blending with the carbon aged concentrate and catalyst. After incorporation of the ingredients by mixing and compounding on differential rubber rolls until a homogeneous mixture was obtained, the actual composition contained the following materials in approximately the proportions cited below:

| | Parts |
|---|---|
| Polydimethylsiloxane | 105.5 |
| Silica aerogel (Santocel CS) | 46.1 |
| Benzoyl peroxide | 3.2 |
| Carbon black | 1.7 |

Each formulation was then molded using the same molding cycle described in Example 1, and the molded sheets heated for 24 hours at 250° C. in an air-circulating oven and for another 24 hours at 315° C. After each of the latter two heating cycles, the samples were tested for Shore A hardness, tensile strength, and percent elongation. Table V below shows the various types of carbon, including carbon black and graphite, which were employed together with the test results obtained in connection with the samples using the specific carbon. In addition, a control was molded and tested to compare the properties of the latter with samples containing the carbon.

ASTM method B (ASTM 395–49T) which calls for heating samples of the materials under compression for 70 hours at 150° C. The following Table VI shows the results of such compression set tests after first aging the samples for 24 hours at 250° C. and then for 24 hours at 315° C. Since the control could not be heated at 315° C., the compression set disclosed for this compound in Table VI was conducted on samples which were heat-aged for 24 hours at 250° C.

*Table VI*

| Compound No.* | Percent Compression Set |
|---|---|
| Control | 65–70 |
| 1 | 52.9 |
| 2 | 47.5 |
| 3 | 56.0 |
| 4 | 42.0 |

* See Example 1 for composition.

*Table V*

| Type Carbon Black | 24 Hours at 250° C. | | | 24 Hours at 315° C. | | |
|---|---|---|---|---|---|---|
| | Shore A Hardness | Tensile strength, p. s. i. | Percent Elongation | Shore A Hardness | Tensile strength, p. s. i. | Percent Elongation |
| Control (no carbon black) | 46 | 715 | 205 | 80 | 328 | 50 |
| Kosmos 20 SRF | 52 | 763 | 150 | 67 | 424 | 60 |
| Furnex SRF | 58 | 825 | 190 | 61 | 479 | 70 |
| Kosmos 50 HMF | 49 | 833 | 183 | 60 | 594 | 92 |
| Statex 93 HMF | 50 | 803 | 197 | 60 | 578 | 92 |
| Statex KRF | 48 | 840 | 228 | 59 | 490 | 87 |
| Sterling 99 FF | 50 | 803 | 207 | 60 | 620 | 103 |
| Vulcan 3 RF (HAF) | 47 | 727 | 217 | 60 | 570 | 106 |
| Sterling 105 RF (FF) | 49 | 809 | 215 | 61 | 650 | 100 |
| Micronex W6 EPC | 49 | 726 | 192 | 60 | 557 | 85 |
| Micronex Std. MPC | 48 | 707 | 213 | 63 | 530 | 100 |
| Spheron 9 | 46 | 636 | 227 | 63 | 488 | 88 |
| Shawinigan Black CF | 47 | 740 | 197 | 64 | 562 | 88 |
| Control (no carbon black)[1] | 40 | 771 | 250 | (2) | (2) | (2) |
| Acheson graphite [1] | 40 | 764 | 280 | (3) | (3) | (3) |
| Bone black [1] | 40 | 618 | 290 | 60 | 462 | 100 |

[1] These samples used a different batch of polydimethylsiloxane and different silica aerogel thus accounting for the difference in results listed for the two controls.
[2] Decomposed.
[3] Flexible but somewhat brittle.

In the above Table V, the symbols employed above have the following meanings:

SRF—semi-reinforcing furnace
CF—conductive furnace
HMF—high modulus furnace
HAF—high abrasion furnace
FF—fine furnace
MPC—medium processing channel
EPC—easy processing channel
CC—conductive channel
RF—reinforcing furnace The various carbons including carbon blacks, graphites, etc., which may be employed in the practice of the present invention are more particularly described and identified in the book entitled "Developments and Status of Carbon Black" by Isaac Drogen, director of research of the United Carbon Company, Inc., of Charleston, West Virginia, said book being published by the United Carbon Company in 1945. This book which is intended to constitute part of the present description of the invention describes the various carbons and their properties, the various methods of manufacture, the identification of such carbons, and the companies which manufacture the different types of carbon as well as the trade names assigned to such multitude of carbons.

EXAMPLE 5

To show the improvement realized in compression set of silicone rubber using the carbon additive, the cured samples based on compound numbers 1 to 4 described in Example 1 as well as the control in which the carbon was omitted, were tested for compression set using

EXAMPLE 6

This example illustrates the improvement possible in certain electrical properties of silicone elastomers due to the incorporation therein of carbon, in this case, acetylene black. More particularly, a mixture of ingredients was prepared comprising 100 parts of the polydimethylsiloxane described in Example 1, 45 parts silica aerogel (Santocel CS), 1.65 parts benzoyl peroxide and 6 parts of the aforementioned acetylene black. For control, another sample was made up identical with the one described immediately above with the exception that the acetylene black was omitted. Each mixture of materials was compounded on rubber differential rolls, molded using the molding cycle described in Example 1, and thereafter heat-aged for 24 hours at 250° C. At the end of this time, each of the samples was tested for dielectric strength and power factor with the following results as shown in Table VII.

*Table VII*

| Sample Composition | Dielectric Strength, volts/mil (50 mils) | Power Factor |
|---|---|---|
| Control | 390 | 0.0083 |
| Sample Containing Acetylene Black | 640 | 0.0039 |

EXAMPLE 7

As was pointed out previously, it is often desirable to improve the flame retardency properties of silicone rubbers. However, the incorporation of usual flame retardents in silicone rubber has the detrimental effect that at elevated temperatures the heat-resistant properties of the silicone rubber are materially reduced. This example shows the effect of using small amounts of carbon, in this case an aged concentrate of Shawinigan carbon black CF which is more particularly described in Example 1. The particular formulation employed was as follows:

Ingredients: Parts
- Polydimethylsiloxane _____ 100
- Silica aerogel (Santocel CS) _____ 25
- Carbon black (in the form of aged concentrate) _____ 6
- Benzoyl peroxide _____ 4
- Zinc borate _____ 6
- Bismuth oxide _____ 6

A control was also made by using the same ingredients as described but with the exception that the aged concentrate of carbon black was omitted. Each of the samples was then molded at about 130° C. for 15 minutes under pressure of about 500 p. s. i. and thereafter heat-aged for 24 hours at 250° C. After this, each sample was heated in an air-circulating oven for 24 hours at 320° C. The sample containing the carbon black was still flexible and had considerable strength after this last heat-aging cycle. In contrast to this, the control sample from which the carbon black had been omitted was very brittle and hard, and had scarcely any strength.

The manufacture of organopolysiloxanes convertible by heat (generally in the presence of vulcanizing agents) to the solid elastic state is beset with many control difficulties. Thus, many times it is difficult to obtain products having essentially the same characteristics despite the fact that so far as is known identical conditions, ingredients, and concentration of ingredients were used each time. It is therefore apparent that since one batch of the heat-convertible organopolysiloxane, for example, polydimethylsiloxane may vary from the next batch, that controls are necessary in each case in order to compare properly the properties of the control with the modified materials. This will explain in some measure the reason why differences in properties were obtained not only in the controls but even in samples containing carbon in which apparently identical conditions and ingredients in the same amounts were employed. The presence of the carbon tends to level off these differences from batch to batch. Nevertheless, for the reasons cited above, the results in the following Example 8 are somewhat different from the results obtained in previous examples even though it may seem that identical ingredients were used.

EXAMPLE 8

In this example 100 parts of the polydimethylsiloxane prepared similarly as that described in Example 1 were mixed with two parts of a Shawinigan carbon black CF aged concentrate and one part benzoyl peroxide. The two parts of the aged concentrate of carbon black were prepared again by intimately mixing one part of the carbon black with two parts of the polydimethylsiloxane and permitting the mixture to age for 16 hours at room temperature. A similar mixture was prepared with the exception that instead of using the straight polydimethylsiloxane, there was employed a polydimethylsiloxane containing approximately 5 mol percent intercondensed methyl phenylsiloxane [$(C_6H_5)CH_3SiO$]. The methyl phenylpolysiloxane was in such proportion that there was approximately 2.4 mol percent phenyl groups based on the total number of methyl and phenyl groups. In each case controls were also prepared in which the carbon black was omitted from the polydimethylsiloxane and from the polydimethylphenylsiloxane. Each sample formulation was molded using the same molding cycle described in Example 1 and heat-aged for 24 hours at 250° C. and then for an additional 24 hours at 315° C. The following Table VIII shows the results of tests on all the samples.

Table VIII

| Type Organopolysiloxane | Aging at 250° C. | | Aging at 315° C. | |
|---|---|---|---|---|
| | Control | With Carbon Black | Control | With Carbon Black |
| Polydimethylsiloxane: | | | | |
| Shore A Hardness | 45 | 50 | 60 | 65 |
| Tensile Strength _____ p. s. i. | 948 | 916 | 342 | 673 |
| Elongation _____ percent | 310 | 230 | 75 | 100 |
| Polydimethylphenylsiloxane: | | | | |
| Shore A Hardness | 47 | 45 | 88 | 63 |
| Tensile Strength _____ p. s. i. | 1,030 | 931 | 90 | 460 |
| Elongation _____ percent | 420 | 330 | 10 | 85 |

It should be noted from the above Table VIII that at 250° C. the presence of the carbon black tends to reduce the percent elongation. However, it has been found that the inclusion of a larger amount of carbon black will compensate for this loss so that products of comparable properties as far as percents elongation are concerned can be obtained in this fashion.

The four samples described in Example 8 were also tested for their high temperature creep factor. This was done by taking dumbbell shaped samples from each of the molded products which had been heat-aged for 24 hours at 250° C., cutting a circular hole in one end of the dumbbell and suspending the dumbbell in an air-circulating oven by means of a piece of wire in a vertical position at a temperature of 315° C. After 24 hours at this temperature, the holes became more or less distorted. The ratio between the vertical and horizontal dimensions of the hole before aging was, of course, 1.00. The ratio of the vertical and horizontal dimensions after this heat-aging at 315° C. was determined by measuring the size of the hole in a vertical and horizontal direction and dividing the vertical dimension by the horizontal dimension. It is these ratios which are found described below in Table IX.

Table IX

| Type Organopolysiloxane | Ratio Control | Ratio Containing Carbon Black |
|---|---|---|
| Polydimethylsiloxane | 1.23 | 1.09 |
| Polydimethylphenylsiloxane | 1.69 | 1.34 |

From the foregoing Table IX, it is apparent that the incorporation of carbon black in the two formulations greatly improved the properties of the material as far as the tendency to creep was concerned.

EXAMPLE 9

This example illustrates the effect of varying the amount of carbon, for example, carbon black in the higher concentration ranges, maintaining the concentration of the cure accelerator the same in some cases, and varying the concentration of the latter in other cases. More particularly as shown in Table X the polydimethylsiloxane employed in Example 1 and described earlier was mixed together and compounded on rubber differential rolls with varying amounts of silica aerogel, benzoyl peroxide and carbon black specifically Furnex semi-reinforcing carbon black (in the form of an aged concentrate prepared similarly as in Example 1), each mixture molded in the form of flat sheets at about 130° C. for about fifteen minutes at a pressure of approximately 500 p. s. i. Thereafter, the molded samples were further heated in an oven for two hours at 250° C. Each sample was heat-aged under different conditions after the aforementioned molding and post-heating cycle as is more particularly described in Table XI. After each heat-aging period, the samples were tested for their tensile strength, percent elongation, and Shore A hardness. The following two tables show the formulations employed in each case together with the test results obtained on each sample:

Table X

| Sample No. | Parts Polydimethylsiloxane | Parts Silica Aerogel | Parts Benzoyl Peroxide | Parts Carbon Black |
|---|---|---|---|---|
| 1 | 100 | 45 | 2.0 | 7.5 |
| 2 | 100 | 45 | 2.5 | 7.5 |
| 3 | 100 | 45 | 3.0 | 7.5 |
| 4 | 100 | 45 | 3.0 | 9.1 |
| 5 | 100 | 45 | 3.0 | 10.8 |
| 6 | 100 | 45 | 3.5 | 10.8 |
| 7 | 100 | 45 | 4.0 | 10.8 |
| 8 | 100 | 30 | 3.6 | 16.7 |
| 9 | 100 | 30 | 6.7 | 37.5 |
| 10 [a] | 100 | 45 | 1.65 | none |
| 11 | 100 | 45 | 3.0 | 9 |
| 12 | 100 | 45 | 3.0 | 12 |
| 13 [b] | 100 | 45 | 3.0 | none |

[a] Control for Sample Nos. 1 to 9, inclusive.
[b] Control for Sample Nos. 11 and 12.

Table XI

HEAT AGING

| Sample No. | 24 hrs./250° C. | | | 24 hrs./315° C. | | | 24 hrs./250° C., 24 hrs./315° C. | | |
|---|---|---|---|---|---|---|---|---|---|
| | Tensile, p. s. i. | Percent Elongation | Shore "A" Hardness | Tensile, p. s. i. | Percent Elongation | Shore "A" Hardness | Tensile, p. s. i. | Percent Elongation | Shore "A" Hardness |
| 1 | 555 | 205 | 60 | 695 | 160 | 70 | (2) | (2) | (2) |
| 2 | 700 | 220 | 65 | 650 | 110 | 70 | (2) | (2) | (2) |
| 3 | 785 | 205 | 68 | 650 | 110 | 73 | (2) | (2) | (2) |
| 4 | 875 | 240 | 68 | 865 | 110 | 73 | (2) | (2) | (2) |
| 5 | 775 | 205 | 70 | 670 | 140 | 72 | (2) | (2) | (2) |
| 6 | 680 | 155 | 70 | 585 | 90 | 78 | (2) | (2) | (2) |
| 7 | 815 | 180 | 70 | 550 | 100 | 78 | (2) | (2) | (2) |
| 8 | 760 | 300 | 45 | 410 | 150 | 55 | (2) | (2) | (2) |
| 9 | 645 | 135 | 52 | 280 | 40 | 72 | (2) | (2) | (2) |
| 10 | 675 | 180 | 60 | (1) | (1) | (1) | (2) | (2) | (2) |
| 11 | 725 | 230 | 65 | 680 | 90 | 67 | 695 | 120 | 66 |
| 12 | 720 | 255 | 65 | 623 | 135 | 66 | 695 | 135 | 68 |
| 13 | 785 | 165 | 65 | (1) | (1) | (1) | (1) | (1) | (1) |

[1] Fell apart (control).
[2] No measurements.

It will, of course, be apparent to those skilled in the art that various other diorganosiloxanes having the structural unit $R_2SiO$, where R is a member selected from the class consisting of lower alkyl radicals and aryl radicals, may be employed in place of those described in the foregoing examples. Thus, instead of using a polydimethylsiloxane, one may employ, for instance, a polydiethylsiloxane which has been suitably processed to the substantially non-flowable state but which is still benzene-soluble. Generally, I prefer that R be a methyl group when choosing a lower alkyl radical and that R be a phenyl group when choosing the aryl radical. Obviously other methods of preparing the above-described benzene-soluble diorganosiloxanes convertible to the solid elastic state may also be employed keeping in mind that the alkalinity of the convertible product is of importance.

As is apparent from the preceding description, the amount of catalyst which may be used to effect vulcanization or curing as well as the amount of carbon employed in the practice of the invention may be varied within the limits described above. It has been found that in contrast to other discoveries, the use of such catalysts as tertiary butyl perbenzoate when employing the carbon is not suitable in the practice of the present invention since the latter catalyst appears to promote poor elongation at high temperatures. The use of larger concentrations of carbon (in whatever form employed) tends to improve the flexibility of the product but at the same time appears to require larger amounts of the cure accelerator, namely, benzoyl peroxide. It is, therefore, believed apparent to persons skilled in the art that various factors will have to be considered in determining the optimum amounts of cure accelerator as well as carbon to be used in each application. The specific use for which the finally heat-treated or cured product is to be applied will in many respects dictate the concentrations of the carbon and the cure accelerator.

Also, it is intended within the scope of the invention that the type of fillers used may also be varied and any one of those previously mentioned as well as others employed in the manufacture of silicone rubber may be used. Again, the type of filler used will be dependent in many respects on the type of application for which the end product is to be used. Regardless of the type of filler employed, material advantages are derived from the incorporation of the carbon, either directly or in the form of the aged concentrate described above. Obviously, the proportion of filler to diorganosiloxane may also be varied within wide limits at the discretion of the user and no intent is to be read into this description as to any particular range or limitation of proportions of filler and benzene-soluble polyorganosiloxane.

The synthetic silicone elastomers prepared and described herein are capable of withstanding satisfactorily not only the elevated temperatures heretofore peculiar only to silicone rubbers for extended periods of time, but now they are able to withstand temperatures above 300° C. for times as long as they are able to withstand temperatures of 250° C. This resistance to high heat is often accompanied by an improvement in some of the physical properties of the silicone rubber over the same properties found therein when it is tested after heat-aging at 250° C. The desirable rubbery properties of the compositions herein disclosed and claimed are also available at temperatures as low as −50 to −60° C. The incorporation of the carbon does not harm this low temperature property. The presence of aryl groups, specifically phenyl groups, in the organopolysiloxane is beneficial as far as low temperature characteristics are concerned.

Because of such a range of properties, the products described in the present invention are highly useful as insulation materials for electrical conductors, as gasket materials which may be subjected to extremely high temperatures, as shock absorbers, and for other applications in which other known natural or synthetic rubbers have heretofore been unacceptable for use at elevated temperatures. My compositions can replace many presently known silicone rubbers due to their extreme heat resistance. Because of the eminent suitability of my compositions at elevated temperatures, it is possible to use them in applications where due to unexpected and unusual operating conditions, the temperature may soar to well above 300° C. and even as high as 400° C. for short periods of time without undesirable degradation or deterioration of the rubbery properties of the material.

What I claim as new and desire to secure by Letters Patent of the United States is:

1. A composition of matter comprising (1) an alkaline-condensed, benzene-soluble polydiorganosiloxane convertible to the cured, solid, elastic state in which essentially all the structural units are R₂SiO where R represents radicals, some of which may be unlike, selected from the class consisting of lower alkyl radicals and aryl radicals and in which polydiorganosiloxane at least 75% of the total number of R groups are lower alkyl radicals, (2) at least 25%, by weight, of an inorganic metallic oxide filler based on the weight of the aforesaid polydiorganosiloxane, and (3) from 0.1 to 12% by weight, based on the weight of the polydiorganosiloxane of finely divided carbon in the form of a preformed aged concentrate obtained by permitting from one to two parts, by weight, of the carbon to remain in intimate contact with from one to ten parts, by weight, of a polydiorganosiloxane described in (1) above for a time sufficient to effect interaction between the latter and the carbon.

2. A composition of matter comprising (1) an alkaline-condensed, benzene-soluble polydimethylsiloxane convertible to the cured, solid, elastic state in which essentially all the structural units are (CH₃)₂SiO units, (2) at least 25% by weight, based on the weight of the aforesaid polydimethylsiloxane, of an inorganic metallic oxide filler, and (3) from 0.1 to 12% by weight, based on the weight of the polydimethylsiloxane of finely divided carbon in the form of a preferred aged concentrate obtained by permitting from one to two parts, by weight, of the carbon to remain in the intimate contact with from one to ten parts, by weight, of a polydimethylsiloxane for a time sufficient to effect interaction between the latter and the carbon.

3. A composition of matter comprising (1) an alkaline-condensed, benzene-soluble polydiorganisiloxane convertible to the cured, solid, elastic state in which there are present essentially only dimethylsiloxy and diphenylsiloxy units, at least 90% of the total number of methyl and phenyl groups being methyl groups, (2) at least 25%, by weight, based on the weight of the polydiorganosiloxane of an inorganic metallic oxide filler, and (3) from 0.5 to 12% by weight, based on the weight of the polydiorganosiloxane, of finely divided carbon in the form of a preformed aged concentrate obtained by permitting from one to two parts, by weight, of the carbon to remain in intimate contact with from one to ten parts, by weight, of a polydiorganosiloxane described in (1) for a time sufficient to effect interaction between the latter and the carbon.

4. A composition of matter as in claim 1 in which there is incorporated a curing agent for the diorganosiloxane.

5. A heat-cured product obtained by heating the composition defined in claim 2 with a small amount of a curing agent comprising benzoyl peroxide.

6. A heat-cured product obtained by heating the composition defined in claim 3 with a small amount of a curing agent comprising benzoyl peroxide.

7. The process for obtaining a cured, solid, elastic organopolysiloxane of improved heat stability at elevated temperatures, which process comprises (1) forming a mixture of ingredients comprising (a) an alkaline-condensed, benzene-soluble polydiorganosiloxane convertible to the cured, solid, elastic state in which essentially all the structural units are R₂SiO, where R represents radicals, some of which may be unlike, selected from the class consisting of lower alkyl radicals and aryl radicals and in which polydiorganosiloxane at least 75% of the total number of R groups are lower alkyl radicals, (2) at least 25% by weight, based on the weight of (a) of an inorganic metallic oxide filler, (c) from 0.1 to 12%, by weight, based on the weight of the polydiorganosiloxane of a finely divided carbon in the form of a preformed aged concentrate obtained by permitting from one to two parts, by weight, of the carbon to remain in intimate contact with from one to ten parts, by weight, of a polydiorganosiloxane of the above description for a time sufficient to effect interaction between the latter and the carbon, and (d) a curing agent for (a), and (2) heating the aforesaid mixture of ingredients at an elevated temperature to effect cure of the mixture of ingredients.

8. The process for obtaining a cured, solid, elastic organopolysiloxane of improved heat stability at elevated temperatures, which process comprises (1) forming a mixture of ingredients comprising (a) an alkaline-condensed, benzene-soluble polydimethylsiloxane convertible to the cured, solid, elastic state in which essentially all the structural units are (CH₃)₂SiO units, (b) at least 25% by weight, based on the weight of (a) of an inorganic metallic oxide filler, (c) from 0.1 to 12% by weight, based on the weight of the polydimethylsiloxane, of a finely divided carbon in the form of a preformed aged concentrate obtained by permitting from one to two parts, by weight, of the carbon to remain in intimate contact with from one to ten parts, by weight, of a polydiorganosiloxane of the above description for a time sufficient to effect interaction between the latter and the carbon, and (d) a curing agent for (a), and (2) heating the aforesaid mixture of ingredients at an elevated temperature to effect cure of the mixture of ingredients.

9. The process for obtaining a cured, solid, elastic organopolysiloxane of improved heat stability at elevated temperatures, which process comprises (1) forming a mixture of ingredients comprising (a) an alkaline-condensed benzene-soluble polydiorganosiloxane convertible to the cured, solid, elastic state in which there are present essentially only dimethylsiloxy and diphenylsiloxy units, at least 90% of the total number of methyl and phenyl groups being methyl groups, (b) at least 25% by weight, based on the weight of (a), of an inorganic metallic oxide filler, (c) from 0.1 to 12% by weight, based on the weight of the polydiorganosiloxane, of a finely divided carbon in the form of a preformed aged concentrate obtained by permitting from one to two parts, by weight, of the carbon to remain in intimate contact with from one to ten parts, by weight, of a polydiorganosiloxane of the above description for a time sufficient to effect interaction between the latter and the carbon, and (d) a curing agent for (a), and (2) heating the aforesaid mixture of ingredients at an elevated temperature to effect cure of the mixture of ingredients.

10. A composition of matter comprising (1) an alkaline-condensed, benzene-soluble polydiorganosiloxane convertible to the cured, solid, elastic state in which essentially all the structural units are R₂SiO where R represents radicals, some of which may be unlike, selected from the class consisting of lower alkyl radicals and aryl radicals and in which polydiorganosiloxane at least 75% of the total number of R groups are lower alkyl radicals, (2) at least 25%, by weight, of an inorganic, finely divided silicon oxide filler based on the weight of the aforesaid polydiorganosiloxane, and (3) from 0.1 to 12%, by weight, based on the weight of the polydiorganosiloxane of finely divided carbon in the form of a preformed aged concentrate obtained by permitting from one to two parts, by weight, of the carbon to remain in intimate contact with from one to ten parts, by weight, of a polydiorganosiloxane described in (1) above for a time sufficient to effect interaction between the latter and the carbon.

References Cited in the file of this patent

UNITED STATES PATENTS

| | | |
|---|---|---|
| 2,448,756 | Agens | Sept. 7, 1948 |
| 2,521,528 | Marsden | Sept. 5, 1950 |
| 2,571,039 | Hyde | Oct. 9, 1951 |